(12) United States Patent
Smith et al.

(10) Patent No.: US 6,349,246 B1
(45) Date of Patent: Feb. 19, 2002

(54) PREEMPTIVE CONTROL OF A VEHICLE COMPUTER SYSTEM BASED ON LOCAL AND ENVIRONMENTAL SENSING

(75) Inventors: Gordon James Smith; George Willard Van Leeuwen, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/557,269

(22) Filed: Apr. 24, 2000

(51) Int. Cl.[7] .................................................. G06F 7/00
(52) U.S. Cl. ............................... 701/1; 701/36; 340/500
(58) Field of Search .......................... 701/1, 2, 24, 33, 701/34, 35, 36; 340/901, 425.5, 500; 307/9.1

(56) References Cited

U.S. PATENT DOCUMENTS

| | | | |
|---|---|---|---|
| 4,982,332 A | 1/1991 | Saito et al. ................. 364/449 |
| 5,428,545 A | 6/1995 | Maegawa et al. ........... 364/444 |
| 5,602,739 A | 2/1997 | Haagenstad et al. ........ 364/436 |
| 5,712,632 A | 1/1998 | Nashimura et al. ......... 340/995 |
| 5,732,383 A | 3/1998 | Foladare et al. ............ 701/117 |
| 5,790,974 A | 8/1998 | Tognazzini .................. 701/204 |
| 5,874,905 A | 2/1999 | Nanba et al. ................ 340/995 |
| 5,906,654 A | 5/1999 | Sato ............................ 701/210 |
| 5,908,464 A | 6/1999 | Kishigami et al. .......... 701/208 |
| 5,911,773 A | 6/1999 | Mutsuga et al. ............ 701/200 |
| 5,931,888 A | 8/1999 | Hiyokawa ................... 701/208 |
| 5,938,721 A | 8/1999 | Dussell et al. .............. 701/211 |
| 5,959,577 A | 9/1999 | Fan et al. ............... 342/357.13 |
| 6,161,071 A | * 12/2000 | Shuman et al. ............... 701/48 |
| 6,202,008 B1 | * 3/2001 | Beckert et al. ............... 701/33 |

* cited by examiner

*Primary Examiner*—Yonel Beaulieu
(74) *Attorney, Agent, or Firm*—Gero G. McClellan; Moser, Patterson & Sheridan, L.L.P.

(57) ABSTRACT

Method and apparatus for controlling data communications in response to environmental cues. The transmission and/or reception of data by a computer disposed onboard a vehicle may be controlled to avoid loss of data, unintentional transmission of data, etc., where predetermined environmental conditions are detected. In one embodiment, information is buffered when a predetermined condition is satisfied. The predetermined condition may include, for example, deceleration/acceleration, loss of traction, impact to the vehicle, impaired visibility conditions, loss of air pressure in a tire, engine stall and the like.

31 Claims, 7 Drawing Sheets

|     | SENSORS           | 1                                                              | 2                                                   | 3                                                                      | 4                  |
|-----|-------------------|----------------------------------------------------------------|-----------------------------------------------------|------------------------------------------------------------------------|--------------------|
| 328 |                   | (ACCELERATION/ DECELERATION)                                   | (STEERING)                                          | (VISIBILITY)                                                           | (FLUID LOW)        |
| 330 | THRESHOLD VALUE   | N                                                              | N                                                   | Y                                                                      | N                  |
| 332 | ACTION TRIGGERED  |                                                                |                                                     |                                                                        |                    |
| 334 | ACTION            | BUFFER INFORMATION (SET POINTER) HORN ADJUST AUDIO OUTPUT      | BUFFER INFORMATION (SET POINT) ADJUST AUDIO OUTPUT  | BUFFER INFORMATION (SET POINTER) WARNING LIGHT RECOMMEND FOG LIGHTS    | INDICATOR LIGHT    |

EMERGENCY CONDITION SENSORS 104A-B

AUXILARY SENSORS 240

PREEMPTIVE CONTROL OF A VEHICLE COMPUTER SYSTEM BASED ON LOCAL AND ENVIRONMENTAL SENSING

BACKGROUND OF THE INVENTION

1. Field of the Invention

The present invention relates to a computer system and, more particularly, to a computer system adapted for use with a vehicle to alert a driver to conditions present in the environment of the vehicle and to allow control of data processed by the computer.

2. Background of the Related Art

The need for communication of information is becoming increasingly more important to both consumers and businesses. As a result, the presence of data processing systems is becoming pervasive. One market sector which has recognized the importance of data processing systems is the automobile industry. Today's automobiles are typically equipped with numerous data processing devices such as cellular phones, two-way and one-way radios, televisions and onboard computer systems configured to support speech recognition, navigational functions, video information transmission and reception, Internet communication and the like.

One problem with equipping vehicles with data processing devices is the potentially detrimental impact on the driver of the vehicle. The operation of the data processing systems requires the attention of the driver, thereby distracting the driver from his or her driving environment. As a result, the driver's ability to safely operate the vehicle is compromised. Conventional systems require the operator of the vehicle to assess the particular circumstances of the vehicle's environment and make a determination of the degree to which the operator's attention should be directed to operation of the vehicle instead of the data processing devices. However, if the driver misjudges the situation, the result may be harmful to both the operator and other people in the proximity of the vehicle, thereby resulting in property damage and/or personal injury or death. Further, the possibility of the misjudgment by the operator is made more likely in cases where the driver has little or no control over the communication of the information. For example, the driver may be retrieving a voice mail message while operating the vehicle under conditions which require his/her exclusive attention. In the event of a lengthy transmission, the only option provided to the driver is to terminate the communication link and reestablish the link at a later time. In the case of the lengthy voice mail, the driver must listen to the entire recording again including those portions already heard in the previous communication link, thereby significantly increasing the overhead time spent in retrieving and listening to the voice mail. As a result, drivers are more typically inclined to disregard or postpone the most appropriate and safest response to environmental conditions in order to avoid interrupting a data communication.

If, on the other hand, the driver's attention is directed exclusively to the operation of the vehicle in the midst of a communication link, the driver risks losing control over the flow of information. Specifically, some information may be transmitted or received without the driver's intent to do so. As a result, corrective action must be taken by the operator after recovering from the circumstances which provided the initial distraction. In some cases corrective actions may not even be possible.

Therefore, there is a need for a data processing system which is responsive to environmental conditions and/or provides a mechanism for controlling data communications under particular circumstances.

SUMMARY OF THE INVENTION

The invention generally provides an apparatus, article of manufacture and method for signal processing. In one aspect of the invention, a computer system for detecting and responding to operating conditions of a vehicle is provided. The computer system comprises one or more sensors configured to collect operating condition information; a signal processing unit coupled to the one or more sensors and configured to receive and process at least the operating condition information; and at least one of one or more input devices and one or more output devices coupled to the signal processing unit. The sensors provide the operating condition information to the signal processing unit. The signal processing unit is configured to modify the operation of at least one of the input devices and the output devices when the occurrence of an emergency operating condition is determined.

In another aspect of the invention, a computer system for detecting and responding to operating conditions of a vehicle comprises: one or more sensors; one or more input/output (I/O) devices disposed in a cab portion of the vehicle; a signal processing unit comprising a buffer memory and a memory containing predetermined operating condition threshold values; and a transceiver coupled to the signal processing unit configured for wireless communications. The signal processing unit is configured to process operating condition information collected by the one or more sensors. In addition, the signal processing unit causes at least one of preserving a state of a data processing session and terminating a communication link when the predetermined threshold values are satisfied. In addition, the buffer memory is adapted to store information received from at least one of the I/O devices and the transceiver when the predetermined threshold values are satisfied.

In yet another aspect of the invention, a signal bearing medium containing a program which, when executed by one or more processors, causes a computer system to perform inventive steps is provided. The steps comprise receiving vehicle operating condition information, determining whether one or more operating condition information thresholds are satisfied and, if one or more operating condition information thresholds are satisfied, preserving a state of a data processing session between a user disposed in the vehicle and the computer system.

In still another aspect of the invention, a method of processing data by a computer system disposable in a vehicle is provided. In one embodiment, the method comprises detecting operating condition information, determining whether the operating condition information satisfies predetermined threshold values and, if the threshold values are satisfied, preserving a data processing session by modifying at least one of the transmission and reception of information.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a data structure adapted to be stored to and accessed by the onboard computer system.

DETAILED DESCRIPTION OF THE PREFERRED EMBODIMENT

The present invention generally provides a method and apparatus for controlling data communications to and from a vehicle in response to environmental cues. The transmission and/or reception of data by a computer disposed onboard the vehicle may be controlled when predetermined environmental conditions are detected to avoid loss of data, unintentional transmission of data, etc. In one embodiment, information is buffered when a predetermined condition is satisfied. The predetermined condition may include, for example, deceleration/acceleration, loss of traction, impact to the vehicle, impaired visibility conditions, loss of air pressure in a tire, engine stall and the like. In another embodiment, signals are provided to output devices to alert a driver of the vehicle.

Figure 1:
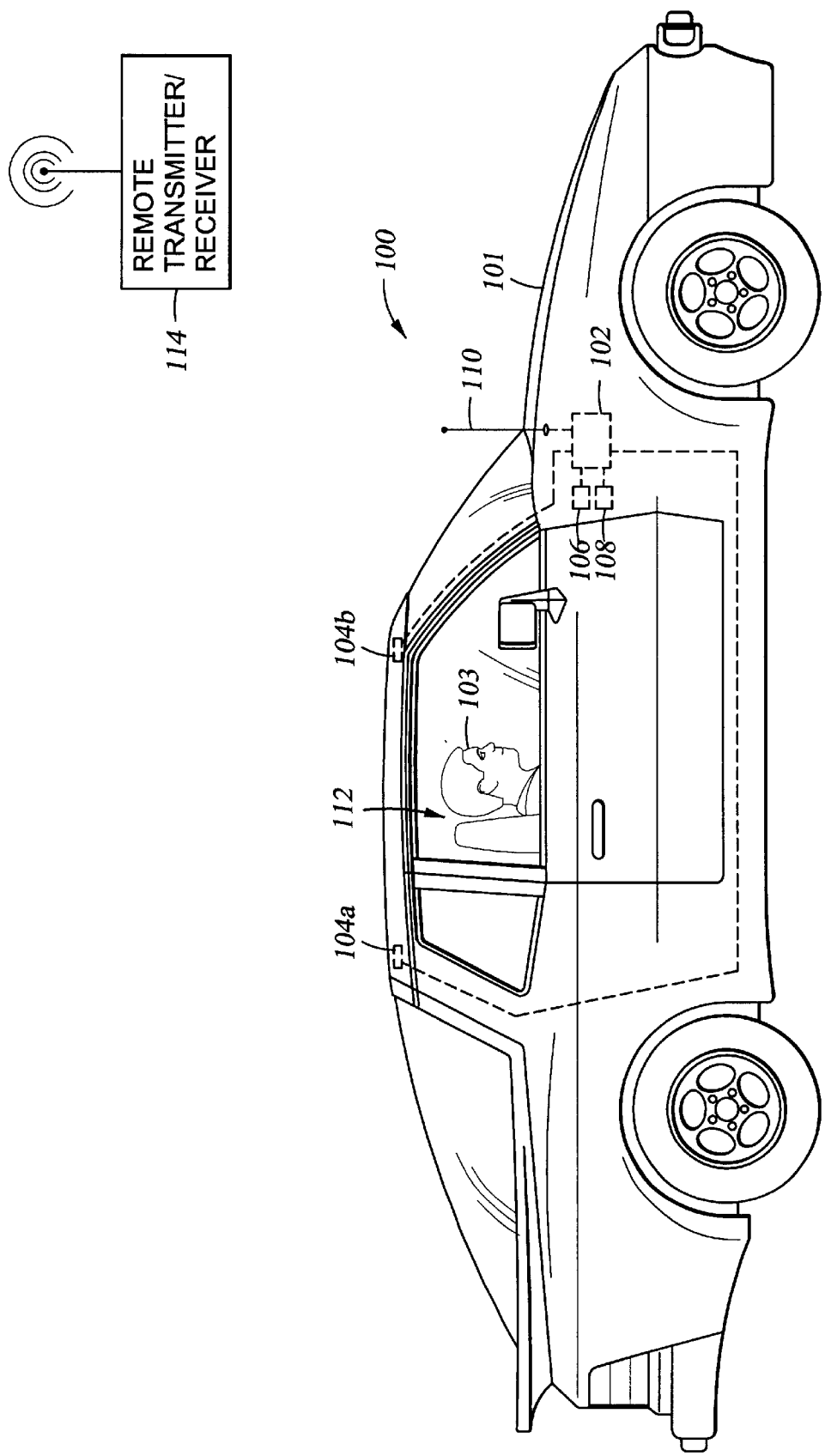
FIG. 1 is a schematic representation of a vehicle having an onboard computer system.

Referring first to FIG. 1, an onboard computer system 100 is shown disposed on a vehicle 101. The onboard computer system 100 includes a signal processing unit 102 which is configured to receive and process signals provided from sensors 104a–b disposed at various locations on the vehicle 101. The sensors 104a–b may be physically connected to the signal processing unit 102 by cables, including electrical or fiber optic cables, for example. Alternatively or additionally, sensors 104a–b may be configured for wireless transmission of collected data to the signal processing unit 102. In general, sensors 104a–b include digital sensors 104a and analog sensors 104b. The sensors 104a–b are configured to collect information about the environmental conditions of the vehicle 101. Illustratively, the sensors 104a–b collect information about the acceleration/deceleration of the vehicle, the visibility of the vehicle's environment, the speed at which nearby objects are approaching, the pressurization of tires on the vehicle 101, the operation of the engine for the vehicle 101 and the like. As such, the sensors 104a–b may include radars, photosensors, sonars, accelerometers and other devices known and unknown in the art.

In addition to receiving information via sensors 104, the onboard computer system 100 is adapted to support any combination of wireless multimedia communication technologies such as cellular telephones, satellite telephones, Internet communications, video/image communications and the like. In one embodiment, a signal receiving/transmitting member, such as an antenna 110, is connected to the signal processing unit 102 to support the appropriate communication technologies. Accordingly, communications may be maintained between the onboard computer system 100 and one or more remote receivers/transmitters 114. The illustrative multimedia devices are represented by input devices 106 and output devices 108 connected to the signal processing unit 102 to allow communication of data to and from an operator 103 of the vehicle 101. Preferably, the input/output devices 106, 108 are disposed in a cab 112 of the vehicle 101 so as to be accessible to the operator 103. The input devices 106 can be any device adapted to provide input to the signal processing unit 102. For example, a keyboard, keypad, light pen, touch screen, button, mouse, trackball, track point or speech recognition unit could be used. The output devices 108 can include warning lights, a radio volume control, cell phone control, radio signal mixer, a graphics/text display, etc. Although shown separately from the input devices 106, the output devices 108 and the input devices 106 could be combined. For example, a display screen with an integrated touch screen and a display with an integrated key word, or a speech recognition unit combined with a text speech converter could be used.

The signal processing unit 102 includes the necessary circuits and devices to control communication of data to the operator 103 of the vehicle 101 via the output devices 108 and from an operator of the vehicle 101 via the input devices 106. In addition, the signal processing unit 102 takes steps to buffer, or temporarily store, all or a portion of the information being received and/or transmitted as will be described below.

One embodiment of the invention is implemented as a program product for use with a computer system such as, for example, the onboard computer processing system 102 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as ROM memory, CD-ROM disks readable by a CD-ROM drive, flash memory and battery-packed RAM); (ii) alterable information stored on writable storage media (e.g, floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

Figure 2:
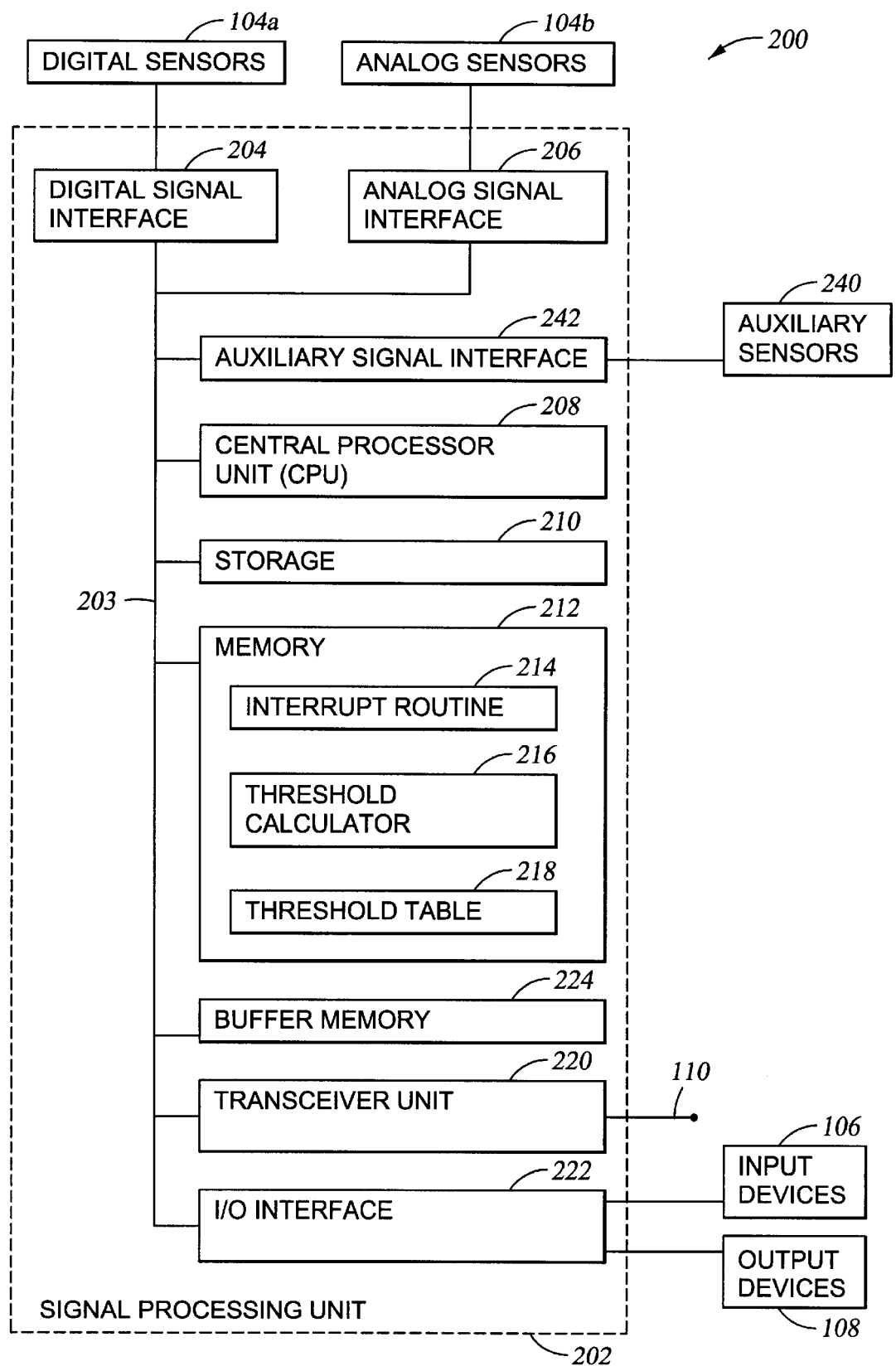
FIG. 2 is a schematic representation of an onboard computer system.

FIG. 2 shows a high level diagram of one embodiment of the onboard computer system 100 (represented as system 200) and signal processing unit 102 (represented as signal processing unit 202). The signal processing unit 202 includes signal interfaces 204, 206, a central processing unit (CPU) 208, storage 210, memory 212, a transceiver unit 220, buffer memory 224, an I/O interface 222 and an auxiliary signal interface 242. The components of the onboard signal processing unit 202 are connected by a bus line 203. The sensors 104a–b are connected to an appropriate signal interface 204, 206 according to the type of signal received by the sensors 104a–b. Accordingly, the digital sensors 104a are coupled to a digital signal interface 204, and the analog sensors 104b are coupled to an analog signal interface 206. The interfaces 204, 206 may be any of a variety of interface units, signal converters, decoders, encoders and the like. The I/O interface 222 may be any entry/exit device adapted to control and synchronize the flow of data into and out of the CPU 208 from and to peripheral devices such as input devices 106 and output devices 108. The auxiliary signal interface 242 provides an entry/exit device coupled to the auxiliary sensors 240. Auxiliary sensors 240 include conventional sensors such as fuel level indicators, service lights and the like.

Memory 212 is preferably a random access memory (RAM) sufficiently large to hold the necessary programming and data structures of the invention. While memory 212 is shown as a single entity, it should be understood that memory 212 may comprise a plurality of modules, and that the memory 212 may exist at multiple levels, from high speed registers and caches to lower speed but larger DRAM chips, as well as static RAM (SRAM). When executed on the CPU 208, the data structures contained in memory 212 are adapted for use by the CPU 208 to control the input/output devices 106, 108 and the buffer memory 224. The contents of memory 212 can be loaded from and stored to the storage 210 as needed by the CPU 208.

Storage 210 can be any known or unknown storage medium including a Direct Access Storage Device (DASD), a floppy disk drive, ROM/memory, battery-packed RAM, removable memory cards, tape drives, an optical storage device and the like. Although storage 210 is shown as a single unit, it could be any combination of fixed and/or removable storage devices. Memory 212 and storage 210 could be part of one virtual address space spanning multiple primary and secondary storage devices. Although not shown, the storage 210 preferably also includes the configuration settings for the onboard computer system 100 which are loaded into memory 212 during the initiation sequence of the onboard computer system 100.

As shown in FIG. 2, the memory 212 contains program and data structures including a interrupt routine 214, a threshold calculator 216 and a threshold table 218. When executed and/or manipulated by the CPU 208, the structures are adapted to determine whether information received by the sensors 104a–b satisfies predetermined thresholds, as will be described in detail below. In one embodiment, the threshold values are contained in the threshold table 218.

An illustrative threshold table 218 is shown in FIG. 3. The table 218 includes a sensor field 328 having an entry for each of the sensors 104a–b, 240 of the onboard computer system 100. A "threshold value" field 330 contains information indicating the minimum quantity being measured by a given sensor 104a–b, 240 sufficient to trigger an action by the signal processing unit 202. The threshold value may be changed as desired and the threshold value field 330 in FIG. 3 merely indicates the operating condition being measured by the sensor rather than a particular quantitative value. The illustrative operating conditions shown for the sensors 104a–b are acceleration/deceleration, steering and visibility. An "action triggered" field 332 contains a value indicating whether the threshold value was met or exceeded causing the signal processing unit 202 to effect an action. The actions associated with each sensor 104a–b, 240 are contained in an action field 334. In general, the actions for the sensors 104a–b include buffering information being processed by the signal processing unit 202 and controlling the operational states of the input/output devices 106, 108. The actions may be further categorized according to the nature of the communication processing being handled by the signal processing unit 102. Thus, the action field 234 may be subdivided into a first set of entries for person-to-person communications (e.g., a telephone conversation) and a second set of entries for person-to-machine communications e.g., retrieving or sending email, downloading from Internet, etc. The latter communications may be further categorized between outbound transmissions and incoming transmissions. In one embodiment, the values contained in the threshold value field 330 and the action field 334 may be user selectable, thereby allowing the vehicle operator to customize the operation of the onboard computer system 200. A dealer or car service personnel might also change thresholds.

During the operation of the onboard computer 200, the interrupt routine 214 is being executed by the central processing unit 208. The interrupt routine might be replaced by a polling routine. Information collected by the sensors 104a–b is provided to the appropriate interface 204, 206 where the collected information may be transformed into data readable by the central processing unit 208. The interrupt routine 214 then calls the threshold calculator 216 in order to determine whether the predetermined thresholds are satisfied by the collected data. The predetermined values contained in the threshold value field 330 of the threshold table 218 are utilized by the threshold calculator 216 in making the determination. If the threshold calculator 216 determines that the predetermined thresholds are satisfied, the interrupt routine 214 generates an interrupt which is transmitted to the central processing unit 208 via the bus 203. The central processing unit 208 may then take steps to control the input and output devices 106, 108 and buffer memory 224 according to the methods described below. In general, the central processing unit 208 operates to control the buffering of all or a portion of information being communicated via the transceiver 220 in the buffer memory 224. In addition, the input/output devices 106, 108 may be controlled or adjusted. For example, the volume setting of a radio may be lowered.

The foregoing embodiments are merely illustrative. It is understood that the one or more of the components of the onboard computer system 100 shown in FIGS. 1 and 2 may be combined and that additional or alternative components may be included according to a particular implementation.

Figure 4:
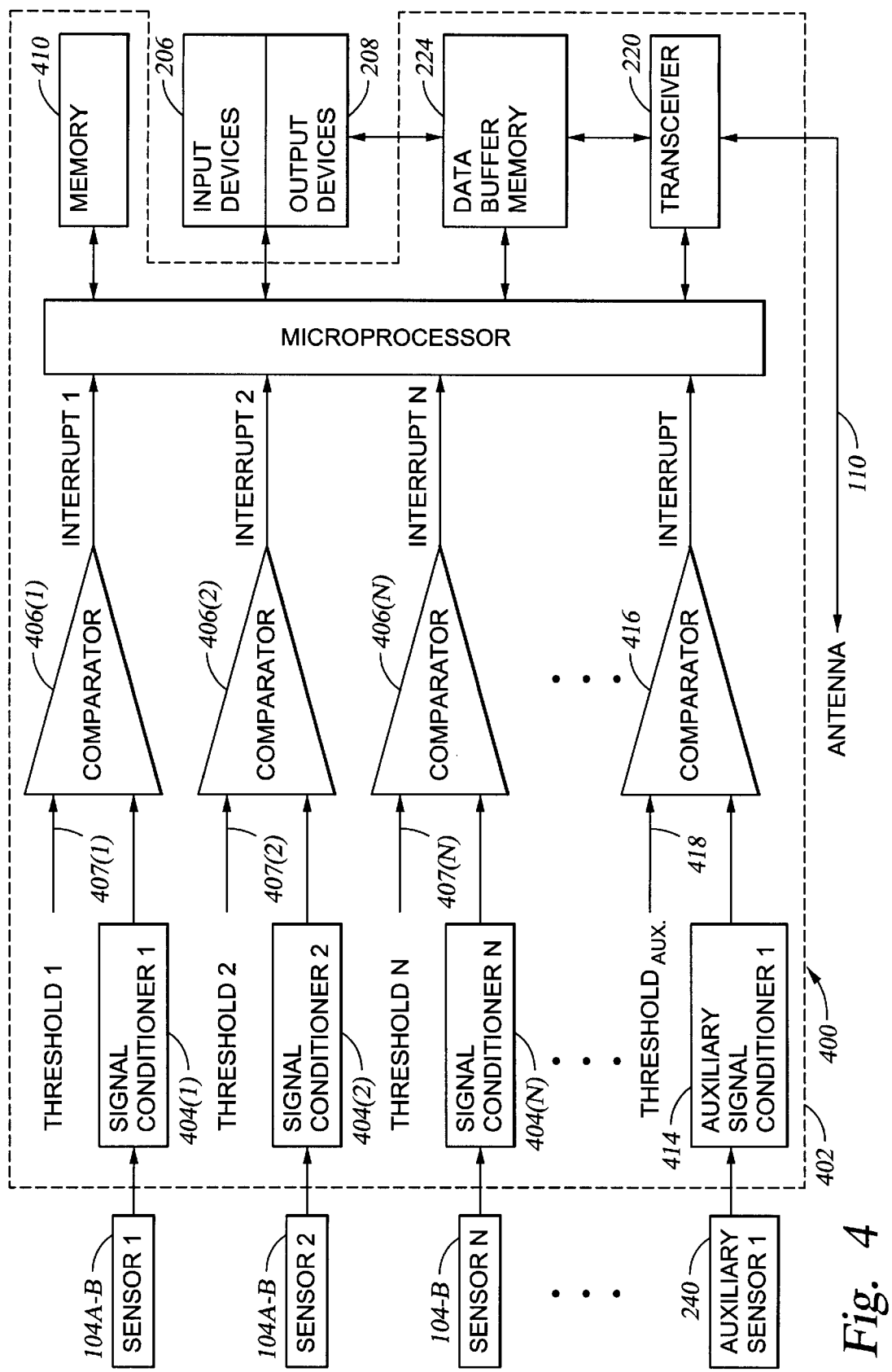
FIG. 4 is a schematic representation of an onboard computer system.

FIG. 4 is another embodiment of the onboard computer system 100 (referenced as onboard computer system 400) and the signal processing unit 102 (referenced as signal processing unit 402). Where appropriate, like numerals are used to identify common components described above. The onboard computer system 400 includes the plurality of sensors 104a–b, 240 connected to the signal processing unit 402. The sensors 104a–b, 240 interface with the signal processing unit 402 via signal conditioners 404(1)–(N), 414. The signal conditioners 404, 414 may include any number of devices adapted to process or condition the signal received from the respective sensor 104a–b, 240. For example, the signal conditioners 404, 414 may include amplifiers, analog to digital converters, digital signal processing (DSP), signal filtering mechanisms and the like. The signal conditioners 404, 414 may also be adapted to calibrate the sensors 104a–b, 240 periodically to ensure the proper operation of the onboard computer system 400.

Each signal conditioner 404, 414 is connected to a comparator 406 (1)–(N), 416. The comparator 406, 416 may be any device configured to provide an interrupt signal in response to an input which satisfies predetermined threshold conditions as indicated by threshold values 407(1)–(N), 418. In some embodiments, the comparator is adjustable to respond to different input values. In addition, the thresholds can be hard-wired or obtained via a digital-to-analog converter or other method of controlling an analog signal.

In operation, an input signal is provided by the respective signal conditioner 404, 414 which may then be processed to determine whether the threshold conditions have been satisfied. If the predetermined threshold conditions are satisfied, an interrupt signal is provided from the comparator 406, 416 to the microprocessor 208. The microprocessor 208 then operates to control the input/output devices 206, 208 according to the methods described below. In general, the communication of information between the transceiver 224 and the input/devices 206, 208 is adjusted or terminated. In the event the communication of information is terminated, the data buffer memory 416 provides a temporary storage from which the information may be retrieved at a later time. The response of the signal processing unit 402 to an interrupt signal may be determined according to values contained in a data structure such as the threshold table 218 shown in FIG. 3.

FIGS. 2 and 4 represent two embodiments which may be generally differentiated as a software-based embodiment in the case of FIG. 2 and a hardware-based embodiment in the case of FIG. 4. However, the particular implementation is not limiting of the invention. Those skilled in the art will recognize that other embodiments are contemplated by the invention, including hybrids of the embodiments shown in FIGS. 2 and 4.

Figure 5A:
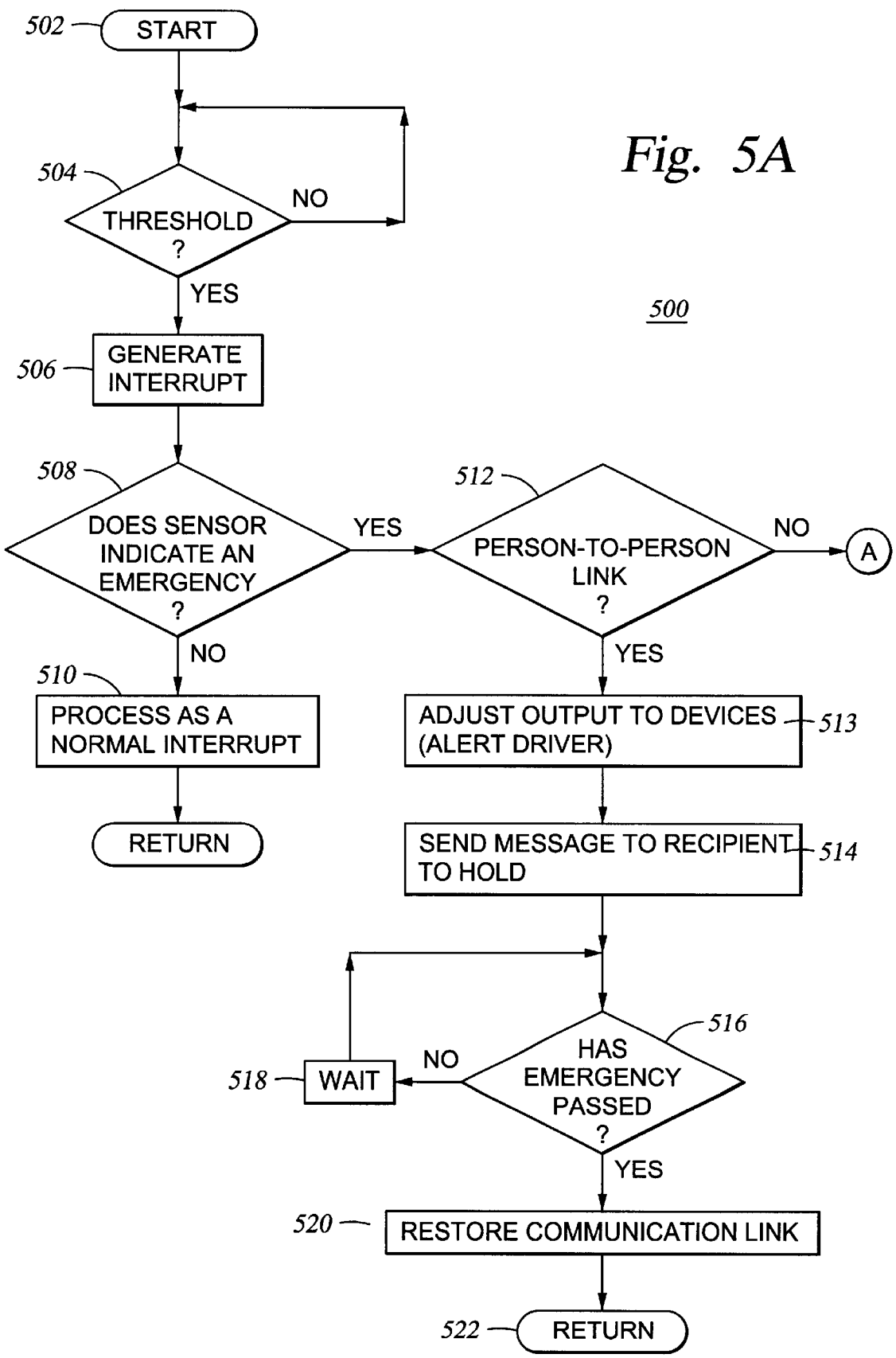
FIGS. 5A–B are a flow diagram of a method for operating an onboard computer system.
Figure 5B:
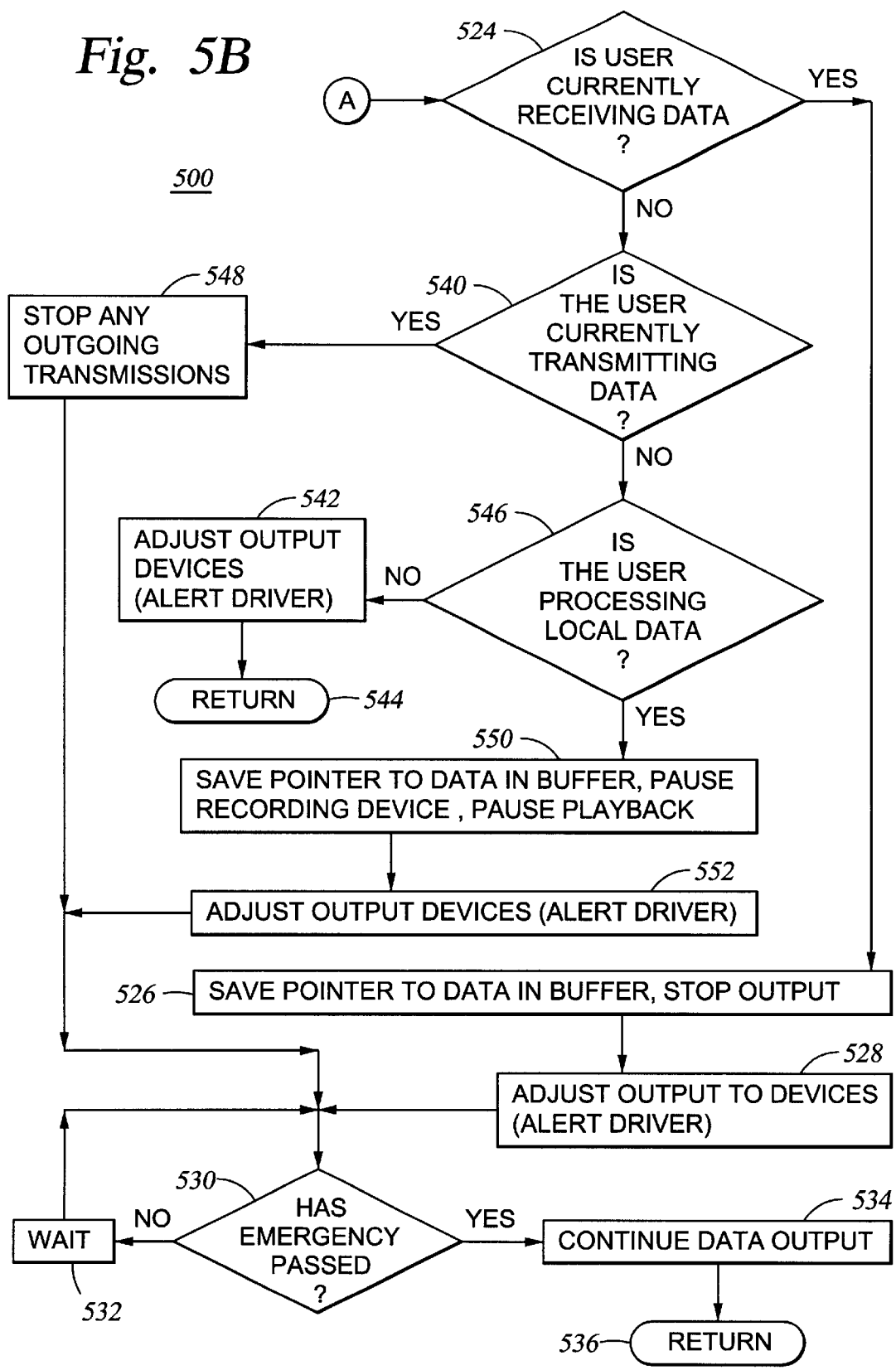
Figure 6A:
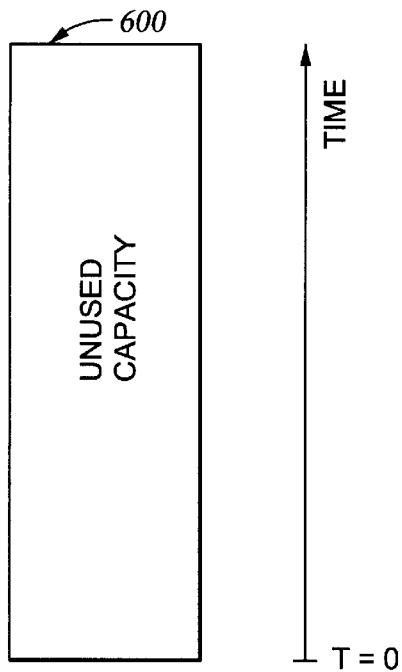
FIGS. 6A–D are an illustration of a buffer memory.
Figure 6B:
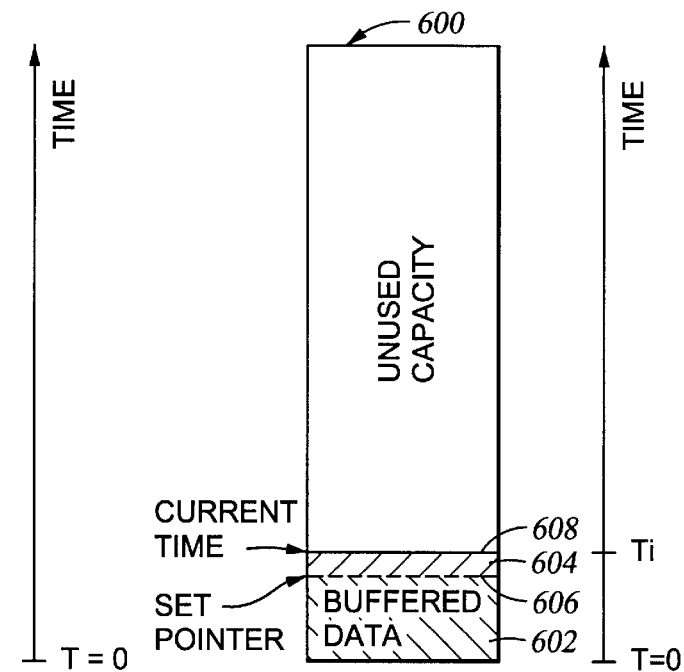
Figure 6C:
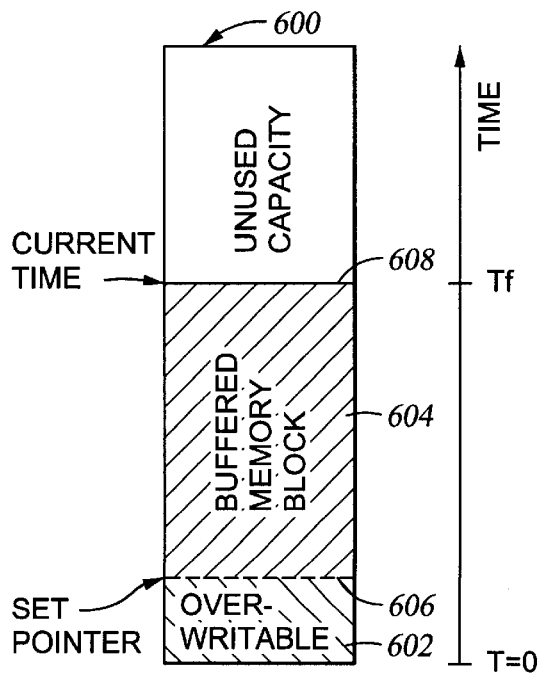
Figure 6D:
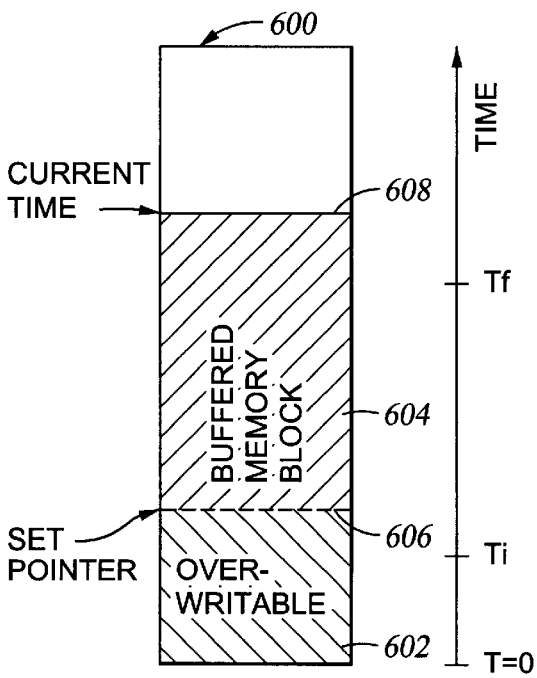

Referring now to FIG. 5, a method 500 is shown for operating the onboard computer system 100. Reference is made to FIGS. 1–4 as is appropriate. The method 500 begins at step 502 which may be the time at which the operator 103 begins operation of the vehicle 101. At step 504 the method 500 queries whether data collected by at least one of the sensors 104a–b, 240 satisfies predetermined threshold conditions contained within the signal processing unit 102. With regard to the signal processing unit 202 shown in FIG. 2, step 504 involves calling the threshold calculator 216 and the threshold table 218 during the execution of the interrupt routine 214. The threshold calculator 216 retrieves values from the threshold table 218 according to the particular sensor 104a–b, 240 providing the information being processed. With regard to the signal processing unit 402 shown in FIG. 4, the query at step 504 involves providing an input signal to the comparator 406, 416 from its respective signal conditioner 404, 414. The input signal characteristics are then compared to the threshold values 407, 418 contained in the comparator 406, 416. If the threshold conditions are not satisfied at step 504, the method 500 is returned to a point before step 504 and continues to loop through step 504 until threshold conditions for one or more sensors 104a–b, 240 are satisfied, at which time method 500 proceeds to step 506.

At step 506, the signal processing unit 102 generates an interrupt signal. At step 508, the method 500 determines whether the interrupt indicates an operational event caused by the vehicle operator 103 (e.g., sudden deceleration) or an operation condition requiring the immediate attention of the operator 103 (e.g., low visibility). As used herein, operational events and conditions are also referred to as "emergency events." Emergency events comprise any event occurring during the operation of the vehicle 101 which may require, or has already required, the operator 103 to make a substantially immediate adjustment in his/her driving behavior and/or direct his/her attention substantially exclusively to the current driving conditions. Illustrative emergency conditions include vehicle acceleration and deceleration; steering behavior (e.g., friction, damping, erratic steering, etc.); loss of traction; poor visibility (due to, for example, fog, rain, sleet, mist, snow, dust, blinding lights, etc.); objects in the path of travel; loss of tire pressure or wheel balance; windshield damage (e.g., a stone or other object hitting the windshield); collision with a vehicle or other object; engine vibration or explosion; sudden increase in engine temperature; sudden loss of engine oil or coolant; loss of braking system or low pressure; deployment of airbag system; and emergency broadcast system alert on a radio and the like. The foregoing list is merely illustrative and other conditions may be considered emergency conditions.

In one embodiment, step 508 is accomplished by determining which device provided the information resulting in the interrupt signal. Thus, if the information was not provided by one of the sensors 104a–b, i.e., the information was provided by one or more of the auxiliary sensors 240, the method 500 proceeds to step 510 to process the interrupt signal according to the device type resulting in the interrupt. Illustratively, step 510 may involve activating one or more indicators on a display panel in order to notify the driver 103 of the vehicle 101 of conditions including low fluid levels such as brake fluid, windshield wiper fluid, engine coolant and the like. In general, step 510 represents detection and processing of non-emergency events/conditions which do not typically require the immediate (i e., on the order of seconds or minutes) attention of the operator 103.

If a determination is made at step 508 that the information was provided by one of the sensors 104a–b, then the method 500 takes steps to control the communication of information being processed by the signal processing unit 102. In one embodiment, the steps taken are dependent on the nature of the processing being handled by the signal processing unit 102. For example, in the embodiment described below, a person-to-person communication link is processed differently than a person-to-machine communication link.

At step 512, a determination is made of whether the existing communication link is a person-to-person communication. Person-to-person communications include, for example, telephone conversations, instant messaging services via the Internet, chat room environments on the Internet and the like. If the communication link is a person-to-person communication, then at step 513 the signal processing unit 102 takes steps to adjust the output devices 108 in order to alert the operator 103 and, if necessary, to mitigate the potential distraction of the operator 103 by the output devices 208. The actions taken at step 513 are contained in the actions field 334 of table 218. Illustratively, the signal processing unit 102 operates to reduce the volume setting on a radio, activate a warning light, output a textual warning message on a display unit, output an audio warning message on an audio device etc. A message is sent at step 514 notifying each of the remote parties to the communication link of a possible delay in communications from the operator 103. Further, the message may request the remote parties to hold until the operator becomes available for further communications. At step 516, the method 500 queries whether the emergency condition determined at step 508 has passed or is still detectable. If the emergency condition is still detectable, then the signal processing unit 102 waits for a predetermined amount of time at step 518 and then loops back to step 516. The loop comprising steps 516 and 518 is repeated until the emergency condition detected at step 508 is no longer detectable by the signal processing unit 102. At step 520 the person-to-person communication link is restored. In one embodiment, the communication link may be terminated in the event the operator 103 is unable to return as a participant in the communication link. Thus, the method 500 may be adapted to terminate the communication link after a predetermined amount of time if the operator 103 initiates no further actions to restore the communication. In another embodiment, the onboard computer system 100 is equipped with call back features to subsequently restore the communication link. At step 522 the method 500 then returns to step 502.

If the method 500 at step 512 does not determine the existence of a person-to-person communication link, then the method 500 queries whether the operator 103 is currently receiving data at step 524 from a remote source (such as the remote transmitter/receiver 114 shown in FIG. 1) via a wireless communication link. Instances of receiving data include retrieving an E-mail message via the Internet, retrieving a voice mail message, receiving an audio or video file, downloading data (e.g., weather, stocks, news, navigation, and special internet preferences) and the like. If the operator 103 is currently receiving data at step 524, the method 500 proceeds to step 526 where steps are taken terminate the output of data to the operator 103 via the output devices 108 and to preserve the status of data communication processing in which the operator 103 was engaged.

If, at step 524, the data the operator is receiving data, output of the information is suspended and the information is stored to the buffer memory 224 at step 526. Step 526 may involve marking or tagging the buffer data with a pointer to facilitate retrieval of the information at a subsequent time. Preferably, the pointer is set on a portion of the buffer data corresponding to a time period shortly prior to the time at which the emergency condition information was received and detected by the sensors 104a–b and signal processing unit 102. The length of time by which the data contained in the buffer memory 224 is "predated" is arbitrarily set but may typically be on the order of a few seconds. Accordingly, subsequent retrieval of the data may include a portion of information already output to the output devices 108. Such a predating feature enables the operator 103 to recall the content and context of the data being received prior to the emergency condition.

Buffering the data and setting a pointer thereon at step 526 is particularly useful in cases where the operator 103 has little or no control over the information flow. For example, the operator may be listening to a radio broadcast or participating in a live teleconference. By terminating the communication link, the operator risks losing important information. Alternatively, the operator 103 may be retrieving a lengthy voicemail message. Conventionally, if the operator 103 terminates the communication link to address an emergency condition, the operator would be required to replay the entire message even if only interested in a latter portion. The present invention, provides a method and apparatus for buffering at least a portion of data received after output to the operator 103 is terminated.

At step 528 the method 500 takes steps to alert the operator 103 to the detected emergency condition. Pausing the output of data at step 526 may have already provided the operator 103 some indication of the emergency condition. However, at step 528 more direct steps may be taken to ensure that the operator 103 is aware of the emergency condition. The steps taken are contained in the action field 334 of the threshold table 218. Illustrative actions include those described at step 513 above.

At step 530 the method 500 queries whether the emergency condition detected at step 508 has passed, i.e., is no longer detectable. If not, the method 500 waits a predetermined amount of time at step 532 and then returns to step 530. The loop comprising step 530 and step 532 is repeated until the emergency condition is no longer detectable in which case the method 500 proceeds to step 534. At step 534 output of the data is resumed. In the event the data was buffered, the buffer memory 224 is accessed to retrieve the information indicated by the pointer set at step 526. Step 524 may be user initiated or may be an automated function of the signal processing unit 102. At step 536, the method 500 returns to step 502.

If, at step 524, the operator 103 is not receiving data, the method 500 proceeds to step 540 and queries the operator 103 is currently transmitting data. Determining whether the operator 103 is currently transmitting data as opposed to receiving data (step 524) can be accomplished by tagging the data. The tagging can be done by the input or output devices used for the generation of the data. The signal processing unit 102 can then read the tag information to determine whether the information is being transmitted or received. If the operator 103 is currently transmitting data, the method 500 proceeds to step 548 and sto-ps any outgoing transmissions. Step 548 prevents the inadvertent transmission of information which the operator 103 does not desire to be transmitted. Such information may include, for example, words spoken by the operator 103 while focusing on the emergency condition at hand. The method 500 then proceeds to step 530 and eventually to step 536 as described above.

If the operator 103 is not transmitting data at step 540, the method 500 queries at step 546 whether the operator 103 is engaged in a local data processing event (i.e., inputting or accessing data locally on the onboard computer system 100 and not currently transmitting the data to a remote location). For example, the operator 103 may be recording an audio e-mail message which, when complete, will be sent in response to a command from the operator 103 such as pressing a "send" button on a Web browser. Other local data processing events at step 546 include E-mail events (e.g., recording, editing, reading/listening), navigation events (e.g., map on LCD screen or turn-by-turn directions), operating an interactive voice response unit, running automobile diagnostics, handling financial transactions, ordering/reviewing merchandise, address book access and editing, engaging concierge services (restaurant, flowers, cards), listening to a cassette tape or CD-ROM being read by the output devices 108, and the like. More generally, the determination at step 546 captures any interactive activity between the input/output devices 106, 108 and the operator 103 which is not determined at step 512, step 524, step 540 and step 540. If the operator 103 is not manipulating data locally at step 546, then the method 500 then proceeds to step 542 described above. A negative response to the query at step 546 indicates that the operator 103 is not currently involved in a communication link or a local data processing session because the operator 103 is not involved in a person-to-person communication (step 512) and is not receiving (step 524), transmitting (step 540), manipulating (step 546) data.

If the operator 103 is engaged in local data processing at step 546, the signal processing unit 102 takes steps to preserve the current data and data processing conditions. In one embodiment, data being manipulated is continually buffered in the buffer memory 224 and step 550 involves setting a pointer on the buffer data. The buffer is set to enable the operator 103 to return to the recorded data at a point concurrent (time-wise) with the occurrence of the emergency condition. Alternatively or additionally, the operation of the input or output device may be suspended to avoid unintentional data manipulation or loss of data. For example, the data the operator is receiving may be is stored on a medium under control of the signal processing unit 102, such as a CD-ROM for example. Thus, step 550 may involve simply pausing the playback of the recorded data.

At step 552 the output devices 108 are controlled to alert the operator 103 of the emergency condition and may include operating the output devices 108 in a manner described above with reference to steps 513, 528 and 542. The method 500 then proceeds to step 530 and continues processing in the manner described above. In the event of a readable medium (e.g., a CD-ROM) being read by the output devices 108, playback is resumed at step 534. In the event that information was buffered, the buffer memory 224 is accessed.

Accordingly, method 500 contemplates any situation in which the operator 103 is distracted from the operation of the vehicle 101 by interaction with the onboard computer 100. Those skilled in the art will recognize other embodiments.

The foregoing is directed to the interaction between an operator 103 and the computer system. However, in one embodiment, the invention contemplates any controlling data processing activity between passengers and the onboard computer system 100 in emergency conditions.

The operation of the invention can be illustrated during the deceleration of the vehicle 101 where at least one of the sensors 104a–b is an accelerometer. Upon deceleration of the vehicle 101, the signal processing unit 102 determines whether the deceleration of the vehicle 101 exceeds a threshold value and thereby constitutes an emergency condition. If the magnitude of the deceleration exceeds the threshold value then the signal processing unit 102 operates to adjust the state of the output devices 108. For example, the signal processing unit 102 may reduce the volume level of an audio device such as a radio. Further, incoming or outgoing visual information such as text, video or image data is buffered in the data buffer memory 224 or otherwise controlled. Incoming audio information such as audible e-mail or voice mail recordings will also be buffered in the data buffer memory 224. Once the emergency operating conditions which caused the signal processing unit 102 to change the state of the output devices 108 or to buffer outgoing/incoming information are no longer detectable by the signal processing unit 102, the vehicle operator 103 may receive or transmit all or a portion of the information contained in the data buffer memory 224. Alternatively or additionally, the devices 206, 208 may be returned to their original (pre-event) state.

Another illustration may be described with regard to a sensor 104a–b configured to collect emergency condition information which may affect the visibility of the vehicle operator. Poor visibility due to fog, mist or smoke, for example, can be detected by a photo-sensitive device mounted to the vehicle 101. In one embodiment, the sensor 104a–b includes a signal transmitting device and a signal receiving device. At least a portion of an optical signal transmitted from the vehicle 101 by the signal transmitting device is scattered and reflected toward the signal receiving device of the sensor 104a–b. The collected information is processed by the signal processing unit 102, or the sensor 104a–b itself, to determine whether the visibility is less than a predetermined threshold value. The processed information can be used alone or combined with inputs from other sensors 104a–b such as accelerometers and radars to control the transmission and reception of communications by the transceiver unit 220 and the storing of information in the buffer memory 224. In addition, warning signals may be provided to the output device 108 to alert the driver of the emergency condition. Normal data communication may be resumed once the vehicle operation information is no longer detected, the operator has stopped the vehicle, or the operator 103 has otherwise elected to continue normal data communications despite the continuing detection of the vehicle operation conditions.

In one embodiment, the onboard computer system 100 is adapted to continually buffer information from a given transmitting unit and allow the operator 103 to receive a delayed transmission after recovering from an emergency condition. Referring to FIG. 6, the embodiment may be illustrated by a scenario in which the operator 103 is listening to a sporting event broadcast on the output device 108 (e.g., a radio), such as a football game. FIG. 6 shows a schematic representation of the buffer memory 224 and a time line beginning at time (T)=0. T=0 may indicate the initiation of a communication link between the transceiver 220 and a remote source, such as the remote source 114 shown in FIG. 1. At T=0 the buffer memory capacity is at a maximum value. At time $T_i$ an emergency condition occurring during the reception of the broadcast triggers actions by the signal processing unit 102 to terminate the output of the broadcast to the driver 103. A pointer is set on buffered data 602 marking a tail 606 of a buffered memory block 604 to which the operator 103 may return at a later time. Preferably, the pointer is set to point to a period of time prior shortly prior to the current time (i.e., the actual time). The buffered memory block 604 is defined by a tail 606 (defined by the pointer) and a head 608 (defined by the latest data received from the transceiver 220). Subsequent to Ti, the broadcast continues to be received by the signal processing system 102 and stored to the buffer memory 224. At a later time, $T_f$, the operator 103 may retrieve the information from the buffered memory block 606 by causing the signal processing system 102 to output the buffered information to the output devices 108. During the time the operator 103 listens to the buffered memory block 606, all subsequent information received from the same broadcast source is stored to the buffer memory 224. As a result, the operator 103 is able to listen to the entire sporting event from $T_i$, although the broadcast is now delayed by a time $T_f - T_i$.

In one embodiment, the buffer memory 224 is freed as the operator 103 listens to the buffered information in order to avoid loss of data due to insufficient memory in the event the transceiver 220 is still receiving the broadcast from the remote source 114. Thus, the buffer memory need only be sufficient to store the information received between $T_f$ and $T_i$.

In another embodiment, the onboard computer 100 is adapted to accommodate multiple vehicle operation events which disrupt the retrieval of information from one instance of buffered memory. For example, in the context of the previous illustration, the operator 103 may encounter one or more events subsequent to $T_f$ while retrieving the information buffered between $T_i$ and $T_f$. Thus, the signal processing unit will again terminate the output of the information from output devices 108. A pointer may be set on the information in the buffer memory corresponding to the point in time the output was terminated and. Additionally, the transceiver unit continues to receive information which is stored to the buffer memory 224.

While the foregoing is directed to the preferred embodiment of the present invention, other and further embodiments of the invention may be devised without departing from the basic scope thereof, and the scope thereof is determined by the claims that follow.

What is claimed is:

1. A computer system for detecting and responding to operating conditions of a vehicle, the computer system comprising:
   (a) one or more sensors configured to collect operating condition information;
   (b) a signal processing unit coupled to the one or more sensors and configured to receive and process at least the operating condition information; and
   (c) one or more peripheral devices coupled to the signal processing unit, wherein each of the peripheral devices is for use by an occupant of the vehicle;
      wherein the signal processing unit is configured to modify the operation of at least one of the peripheral devices when the occurrence of an emergency operating condition is determined during a data processing session between the occupant and the signal processing unit.

2. The computer system of claim 1, wherein the input and output devices comprise multi-media devices.

3. The computer system of claim 1, wherein the peripheral devices comprise recording devices, playback devices and wireless communication devices.

4. The computer system of claim 1, wherein the signal processing unit comprises a buffer memory configured to temporarily store information input to the peripheral devices when the signal processing unit detects the emergency operating condition.

5. The computer system of claim 1, wherein the emergency operating condition comprises environmental conditions.

6. The computer system of claim 1, wherein the signal processing unit comprises one or more comparators coupled to the sensors and configured to output an interrupt signal when the threshold values are satisfied.

7. The computer system of claim 1, wherein the signal processing unit comprises a memory containing threshold values that, when satisfied, cause the signal processing unit to determine the occurrence of an emergency operating condition.

8. The computer system of claim 7, wherein the memory further contains action data representing processing actions taken by the signal processing unit when the threshold values are satisfied.

9. A computer system for detecting and responding to operating conditions of a vehicle, the computer system comprising:
(a) one or more sensors configured to collect operating condition information;
(b) at least one input/output (I/O) device disposed in a cab portion of the vehicle and configured for use by an occupant of the vehicle;
(c) a signal processing unit comprising a memory containing predetermined operating condition threshold values and a buffer memory and coupled to the one or more sensors and the at least one I/O device; and
(d) a transceiver coupled to the signal processing unit configured for wireless communications with remote sources;
wherein the signal processing unit is configured to process at least the operating condition information and to cause at least one of (i) preserving a state of a data processing session during which the occupant is interfacing with the at least one I/O device and (ii) terminating a communication link when one or more of the predetermined operation condition threshold values are satisfied and wherein the buffer memory is configured to store information received from at least one of the I/O device and the transceiver when the predetermined operation condition threshold values are satisfied.

10. The computer system of claim 9, wherein the signal processing unit is configured to cause the at least one of preserving the state of the data processing session and terminating the communication link by modifying data flow between the I/O device, the transceiver, the buffer memory and the signal processing unit when one or more of the predetermined operating condition threshold values are satisfied.

11. The computer system of claim 9, wherein the I/O device comprises a multi-media device.

12. The computer system of claim 9, wherein the one or more sensors are configured to collect operating condition information selected from the group consisting of acceleration, deceleration, steering behavior, loss of traction, atmospheric conditions, obstacles in a path of travel, tire pressure, wheel balance, collision with an object, engine operation, braking system operation, deployment of an airbag system, an emergency broadcast system alert on the I/O device and a combination thereof.

13. The computer system of claim 9, wherein the one or more sensors are configured to collect operating condition information comprising emergency operating condition information.

14. The computer system of claim 9, wherein the memory further contains action data representing the action taken by the signal processing unit in response to operating condition information that satisfies one or more of the predetermined operating condition threshold values.

15. A signal bearing medium containing a program which, when executed by one or more processors, causes a computer system disposed on a vehicle to perform steps, comprising:
receiving vehicle operating condition information;
determining whether one or more operating condition information thresholds are satisfied; and
if one or more operating condition information thresholds are satisfied, preserving a state of a data processing session between a user disposed in the vehicle and the computer system, wherein the user interfaces with the computer system using at least one peripheral device.

16. The signal bearing medium of claim 15, wherein determining whether one or more operating condition information thresholds are satisfied comprises determining whether an emergency operating condition exists.

17. The signal bearing medium of claim 15, further comprising, if one or more operating condition information thresholds are satisfied, providing a warning signal to an output device.

18. The signal bearing medium of claim 15, further comprising interrupting data flow between the at least one peripheral device and the computer system.

19. The signal bearing medium of claim 15, wherein the computer system comprises a transceiver and wherein the data processing session comprises at least one of receiving information by the transceiver from a remote source and inputting information to the at least one peripheral device.

20. The signal bearing medium of claim 15, wherein preserving the state of the data processing session comprises storing communication information in a buffer memory.

21. The signal bearing medium of claim 20, wherein storing communication information in the buffer memory comprises saving a pointer to a memory address.

22. The signal bearing medium of claim 20, further comprising outputting the information stored in the buffer memory.

23. A method of processing data by a computer system disposable in a vehicle, comprising:
detecting operating condition information;
determining whether the operating condition information satisfies predetermined threshold values; and
if the threshold values are satisfied and if a user is interfacing with the computer system via a peripheral device, preserving a state of a data processing session by modifying at least one of the transmission and reception of data between the computer system and a remote device.

24. The method of claim 23, further comprising outputting a warning signal to one or more output devices disposed in the vehicle.

25. The method of claim 23, wherein the predetermined threshold values are selected to determine the occurrence of emergency operating conditions.

26. The method of claim 25, wherein the emergency operating conditions is selected from the group consisting of acceleration, deceleration, steering behavior, loss of traction, atmospheric conditions, obstacles in a path of travel, tire pressure, wheel balance, collision with an object, engine operation; braking system operation; deployment of an airbag system; an emergency broadcast system alert on output devices and a combination thereof.

27. The method of claim 23, further comprising buffering the data if the predetermined threshold values are satisfied.

28. The method of claim 27, further comprising retrieving the buffered data.

29. The computer system of claim 1, wherein the peripheral devices are not configured to control the operation of the vehicle.

30. A method of processing data by a computer system disposable in a vehicle, comprising:

detecting operating condition information;

determining whether the operating condition information satisfies predetermined threshold values; and if the threshold values are satisfied, preserving a state of a data processing session by modifying at least one of the transmission and reception of data, wherein preserving the state of the data processing session comprises:

determining whether the computer system is receiving data from a remote source; and if the computer system is receiving data from the remote source, buffering at least information received subsequent to determining that the operating condition information satisfies predetermined threshold values;

if the computer system is not receiving data from the remote source, determining whether data is being manipulated locally on the computer system by a user disposed in the vehicle; and if data is being manipulated locally on the computer system by the user, buffering information contained in a memory of the computer system.

31. A method of processing data by a computer system disposable in a vehicle, comprising:

detecting operating condition information;

determining whether the operating condition information satisfies predetermined threshold values; and if the threshold values are satisfied, preserving a state of a data processing session by modifying at least one of the transmission and reception of data, wherein preserving the state of the data processing session further comprises:

if the computer system is not receiving data from the remote source, determining whether data is being transmitted to the remote source; and if data is being transmitted to the remote source, terminating transmission of data.

* * * * *